June 25, 1935.  C. T. MORSE  2,006,109

HEATING AND VENTILATING APPARATUS

Filed Sept. 20, 1934  4 Sheets-Sheet 1

June 25, 1935.　　　　　　C. T. MORSE　　　　　　2,006,109
HEATING AND VENTILATING APPARATUS
Filed Sept. 20, 1934　　4 Sheets-Sheet 2

INVENTOR
CLARK T. MORSE.
BY
ATTORNEYS

June 25, 1935. C. T. MORSE 2,006,109
HEATING AND VENTILATING APPARATUS
Filed Sept. 20, 1934 4 Sheets-Sheet 3
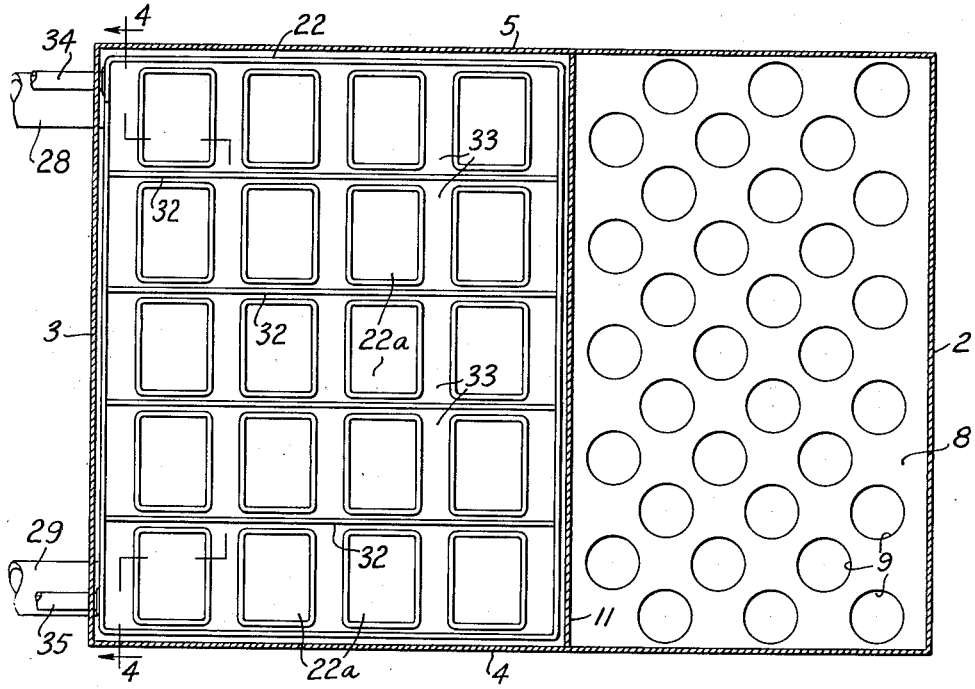
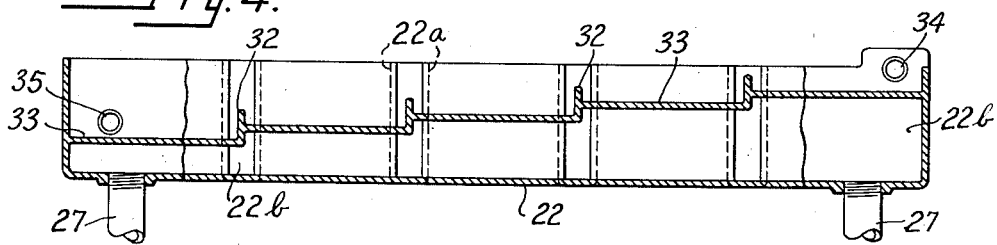
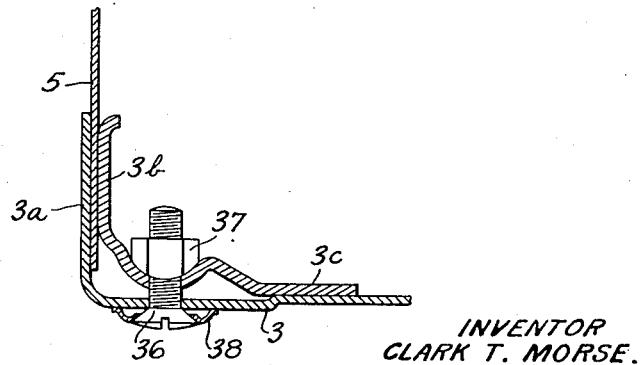
INVENTOR
CLARK T. MORSE.
ATTORNEYS

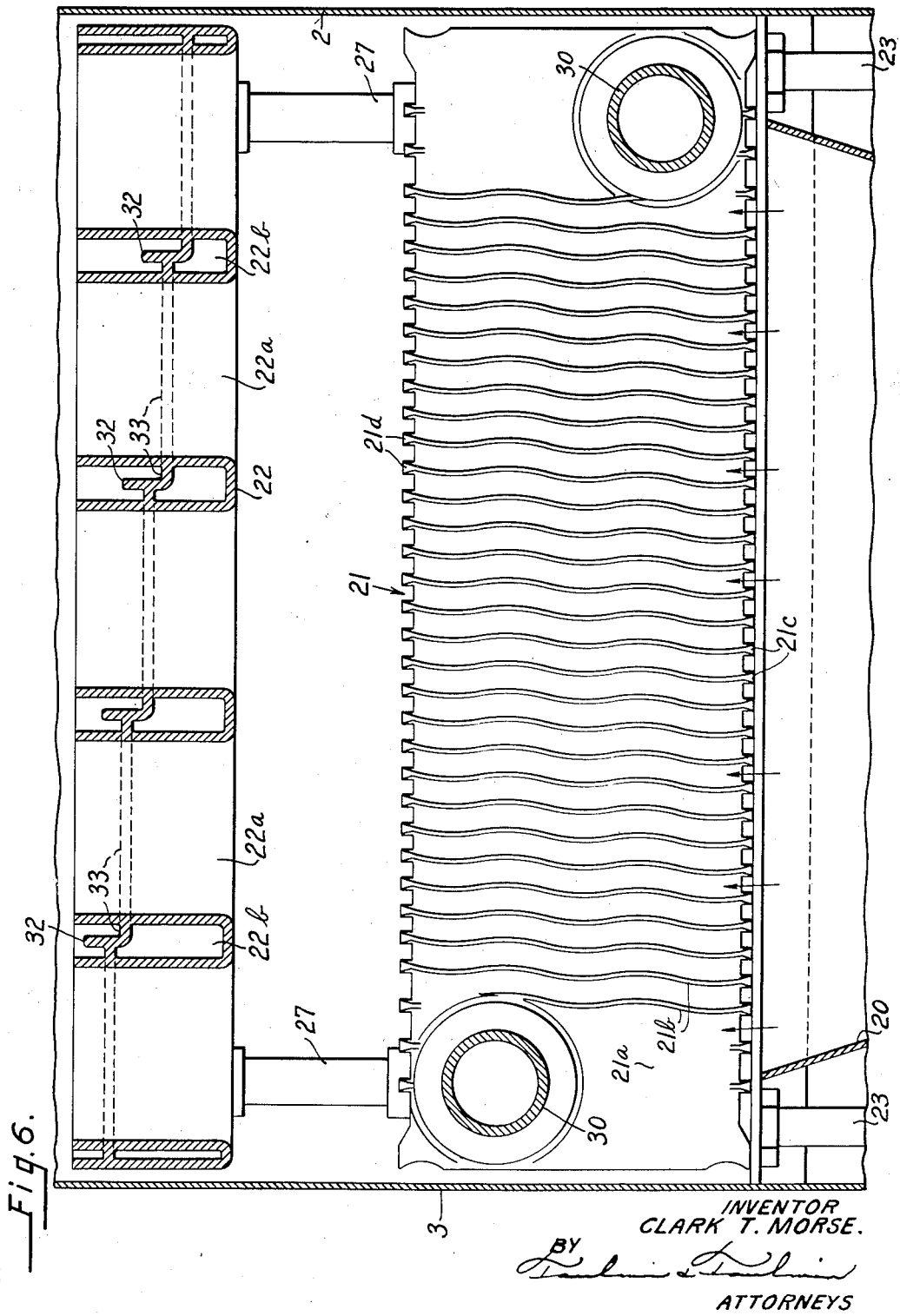

Patented June 25, 1935

2,006,109

UNITED STATES PATENT OFFICE 2,006,109

HEATING AND VENTILATING APPARATUS

Clark T. Morse, Detroit, Mich., assignor to American Radiator Company, New York, N. Y., a corporation of New Jersey Application September 20, 1934, Serial No. 744,783

8 Claims. (Cl. 257—138)

My invention relates to heating and ventilating apparatus and in particular to a unit heater, ventilator and cooler.

It is the object of my invention to provide a compact unitary device with a top inlet and top discharge that provides the maximum area for filtering, cooling, heating and humidification amongst the several instrumentalities for that purpose.

In particular it is my object to provide in a unitary heater where the space requirements are severe and the unit must be reduced to the minimum in size and weight, a heating arrangement which will provide the maximum of heating area with the minimum of air resistance. By reducing the resistance, the size of the motor and fan are reduced. By reducing the size of the heating element, the size of the cabinet and the weight thereof are reduced.

It is a further object to provide the movement of the air at such velocity over the heating element that there will be produced an undetached, undulatory flow of the air over the heating medium, giving the air the maximum contact with the prime and secondary heating surfaces while at the same time insuring a complete and thorough heating of the air and insuring a minimum of resistance to the air movement.

The unit of my invention is a combination of parts so arranged as to secure a thorough treatment of the air by way of filtering, cooling, heating and humidifying over extended surfaces, while at the same time not expanding the unit beyond the feasible limits for its use in industry, and, indeed, even reducing its size to one of small compass so as to make it practical to use units of high capacity.

It is a further object to provide a cheap but very rigid independent structure for supporting the motor, fan, heating unit and humidifier independent of the casing to reduce vibration and to reduce heavy reinforcement on the casing.

Referring to the drawings, Figure 1 is a vertical section through the casing of the unit.

Figure 3 is a section on the line 3—3 of Figure 1 looking in the direction of the arrows, showing the arrangement of the inlets to the filter and the outlets of the humidifier and illustrating the arrangement of the humidifier cascade ribs.

Figure 4 is a section on the line 4—4 of Figure 3 of the humidifier further illustrating the cascade feature in order to give a very broad liquid surface for humidification purposes.

Figure 5 is a sectional detail taken horizontally through one corner of the cabinet casing to indicate a method of holding the vertical cabinet plates in elevation one with the other.

Figure 6 is a detailed side elevation of the heating element showing the arrangement to permit of undetached undulatory flow.

Figure 1:
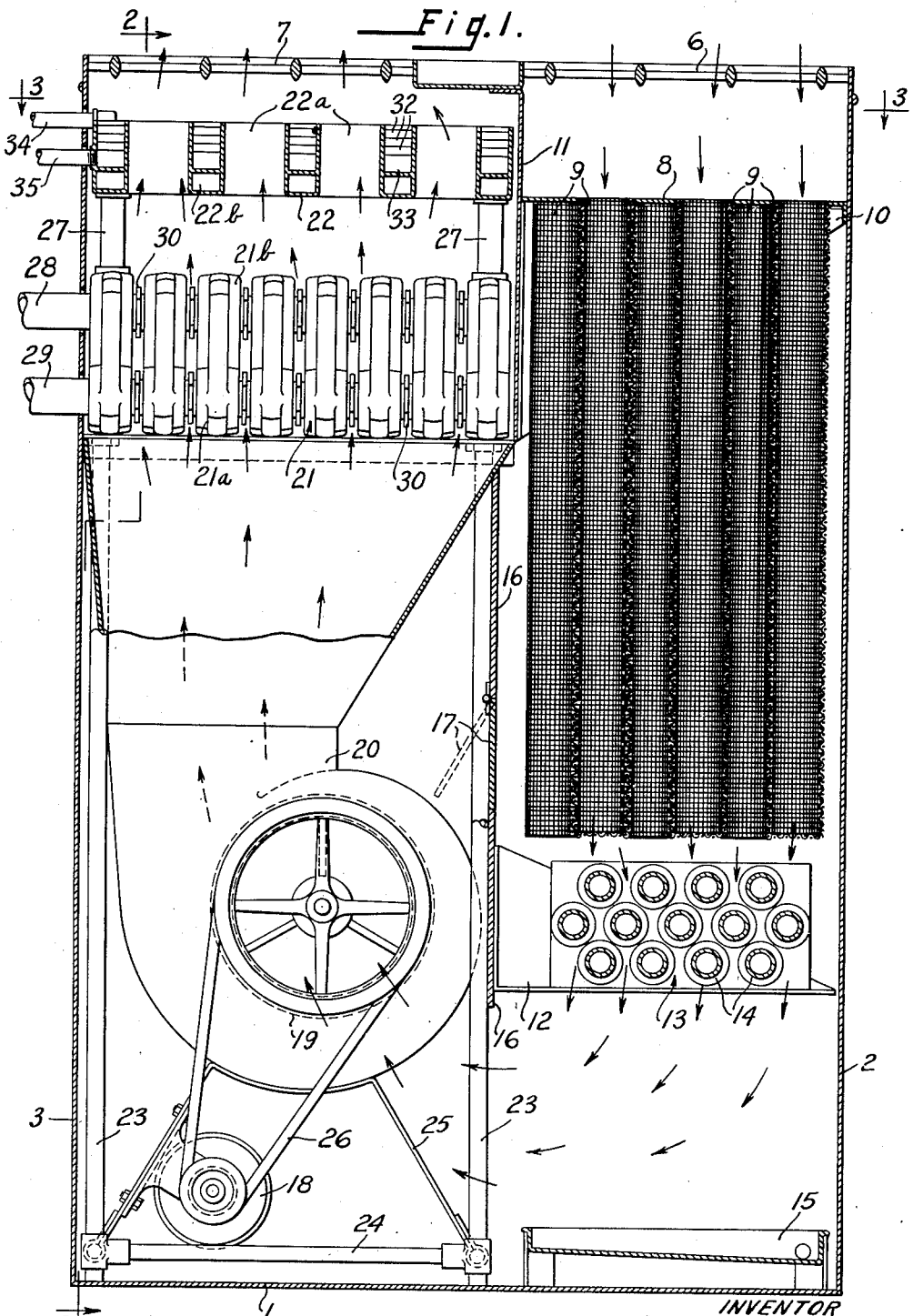
Figure 2:
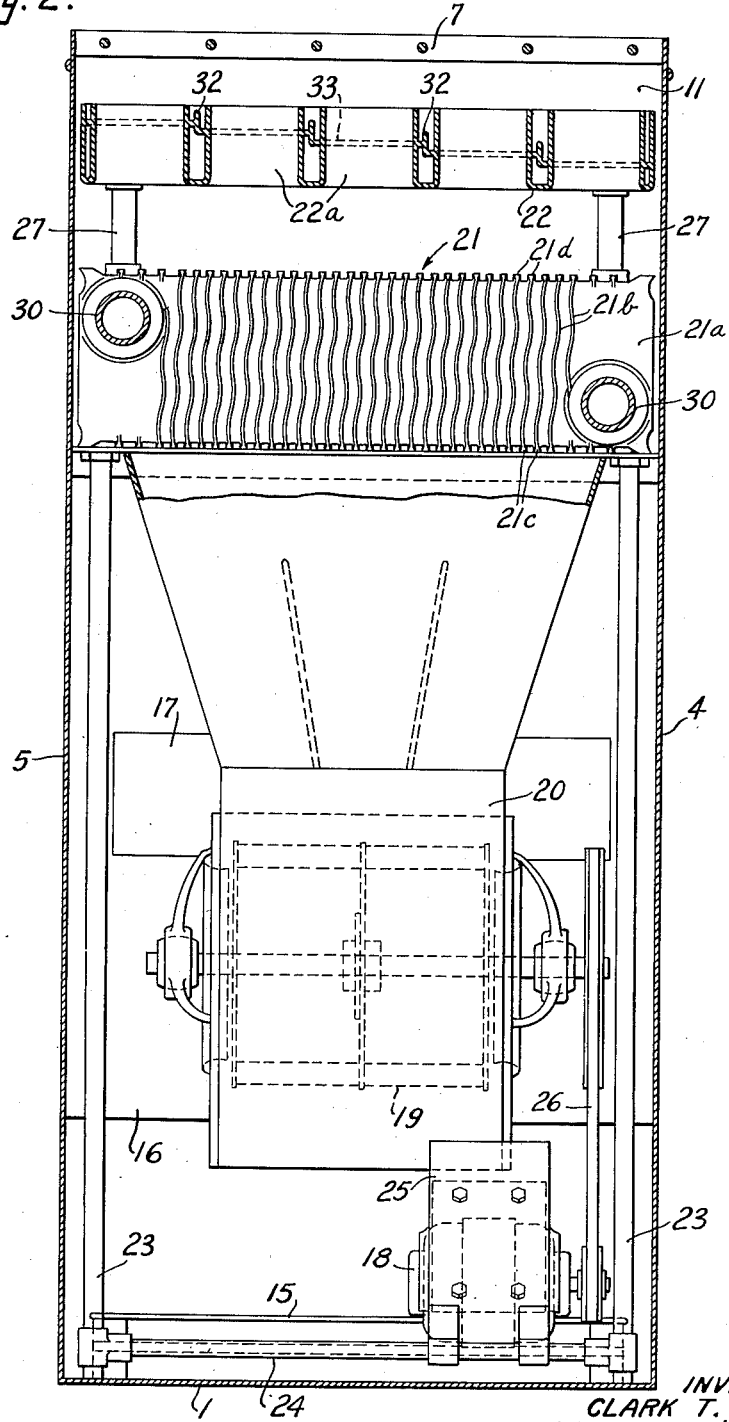
Figure 2 is a section on the line 2—2 of Figure 1 showing in elevation the arrangement of the prime and secondary surfaces of the heating element.

Referring to the drawings in detail, 1 is the bottom of a casing having a plurality of side walls 2, 3, 4 and 5. 6 designates an inlet air grille and 7 an outlet air grille, both arranged on the top of the unit. The inlet air proceeds through the grille 6 and thence through the perforated plate 8 from which are suspended a plurality of filter stockings 9. These stockings provide an extended area for the filter of the air without changing its direction so that a long filter area is presented.

The stockings can be detached and new ones substituted or the old ones cleaned. The perforated plate 8 is mounted on a bracket 10 upon the partition wall 11.

Below the filter stockings is a second pair of brackets 12 supporting between them a cooling unit 13 having preferably finned pipes 14 through which the cooling fluid can be circulated when the unit is being used for cooling and dehumidification purposes. Below this unit is a condensation drip pan 15. Separating the filter in the cooling unit into one side of the casing is a partition wall 16 having an access door 17.

On the left hand side of the casing as viewed in Figure 1 is located a unitary assembly of the motor 18, fan 19, blower casing 20, heating unit 21 and humidifier unit 22. All of these elements are mounted upon a pipe framework that rests upon the floor independent of the side walls of the casing. This pipe framework comprises vertical members 23 and horizontal members 24 forming a substantially square structural framework. Mounted on the oppositely disposed horizontal members 24 is a bracket 25, supporting the motor 18, the fan casing 20 and the fan 19. The motor 18 drives the fan 19 by the belt 26. Mounted on the top of this framework 23 is a heating unit 21 and resting on the heating unit by supports 27 is a humidifier unit 22. These supports 27 also constitute steam passageways for the circulation of steam or other heating fluid through the steam chamber 22b surrounding the air passageways 22a. Thus the air passageways 22a are surrounded with the steam chambers 22b and water pans 33.

The air passes from the right hand side to the left hand side as the unit is viewed in Figure 1, beneath the partition 16, thence into the eye of the fan 19 and upwardly through the casing 20 over the prime and secondary surfaces of the heating unit 21 and thence through the passageways 22a in the humidifier 22 and out through the exit grille 7.

Referring to the heating unit, it will be observed that it is composed of a steam chamber 21a constituting the prime surface and a plurality of vertically disposed undulatory fins or ribs 21b constituting the secondary surface. There are a plurality of these heating units arranged in parallel transversely across the air delivery passageway from the casing 20. The fins 21b are oppositely disposed one from the other with a space therebetween. They should preferably undulate with respect to a center line drawn through them from end to end from 11/64" to 13/64". Within this range there will be an undulatory undetached flow of the air with a maximum heat transfer, the minimum resistance and the maximum velocity. The humidifier is mounted a sufficient distance above the heating units to permit of a thorough mixture of the streams issuing from the heating units and to further prevent any reduction of the velocity of the air passing through the heating units.

It will be noted that the heating units are provided with wedge-shaped ribs 21c and 21d at the entrances and exits between the fins 21b. This facilitates the entry and exit of the air without turbulence and without resistance and these ribs guide the air between the ribs so that the undetached undulatory flow of the air may immediately take place, and the ribs guide the air away from between the ribs so that at the ends of the ribs or fins 21b there will be no turbulence to upset this undulatory movement. Suitable circulation pipes 28 and 29 for circulating the steam or other medium are provided for these heating units, which are attached to one another by the nipples 30. The humidifier comprises a body having a plurality of vertically disposed passageways 22a therethrough. Between these passageways is a series of ribs 32 arranged at successively lower elevations and interconnected by a series of pans 33. The humidifying liquid is introduced by the pipe 34 at the upper elevation and flows over the series of cascade ribs 32 into successive pans 33 until it makes its exit through the pipe 35. In this manner the maximum area of the humidifying liquid is presented to the passage of the air and around the side walls of the passageway 22a.

Referring to Figure 5, one of the side walls 5 is overlapped by one of the walls 3 by the flange 3a. An internally disposed clamp having arms 3b and 3c engages respectively the inside of the wall 5 and the inside of the wall 3. A screw bolt 36 and its nut 37 respectively engage the plate 3 and the clamping plate 3b and 3c, holding the several parts together. A small disc 38 is provided as a support for the screw bolt to give a countersunk effect. By this arrangement, a neat, strong casing is provided which can be easily assembled or disassembled around the internal apparatus and the framework supporting that apparatus.

It will be understood that I desire to comprehend within this invention such modifications as come within the scope of the claims and the invention.

Having thus fully described my invention, what I claim as new and desire to secure by Letters Patent is:

1. In combination, a fan, transversely arranged spaced heating units having undulatory fins adjacent to one another to provide undetached undulatory flow, and means spaced above said units for humidifying the air heated by the heating units, said humidifier being mounted sufficiently far away from the heating units to prevent the free exit of the air from between the fins so as to prevent any impediment to the undetached undulatory flow of the air between the heating units, said fins undulating with respect to a center line drawn through them from end to end from approximately 11/64ths of an inch to 13/64ths of an inch.

2. In combination in a heating and ventilating unit, a casing having parallel passageways with an inlet and outlet opening at the top thereof, filter means below the inlet passageway, blower means, and undulatory fin heating means and humidifying means located below the outlet passageway, said undulatory fin heating means undulating with respect to a center line drawn through them from end to end from approximately 11/64ths of an inch to 13/64ths of an inch.

3. In a heating and ventilating unit, a frame independent of a casing enclosing unit, a motor and blower mounted on the lower end of said frame, a blower casing mounted on the bottom of said frame, and a plurality of heating units connected together on their sides mounted on top of said frame, said units having a plurality of spaced, gently undulatory fins arranged on the sides thereof in the path of the air delivered from said blower casing.

4. In a heating and ventilating unit, a frame independent of a casing enclosing unit, a motor and blower mounted on the lower end of said frame, a blower casing mounted on the bottom of said frame, a plurality of heating units connected together on their sides mounted on top of said frame, said units having a plurality of spaced, gently undulatory fins arranged on the sides thereof in the path of the air delivered from said blower casing, and a plurality of spaced water pans of different elevation having air passageways therebetween mounted on top of said heating units in spaced relationship with respect to them whereby the undulatory motion of the air passed through and between said heating units will not be impeded by said pans.

5. In combination, a heating means having a plurality of spaced parallel passageways therethrough, a spaced heating and humidifying means mounted on the first heating means having a lesser number of parallel passageways therethrough, means interconnecting said heating means for circulating a heating medium from one to the other, and a plurality of water pans on the second heating means surrounding said passageways therethrough.

6. In combination, a plurality of parallel heating chambers having adjacent spaced gently undulatory fins, a humidifying and heating means mounted on the first mentioned heating means and spaced therefrom having a plurality of air passageways therethrough, a steam chamber surrounding said air passageways connected to the first mentioned heating means and supported thereby, and water pans on said second heating means surrounding the air passageways therethrough.

7. In combination, a plurality of parallel heating chambers having adjacent spaced gently undulatory fins, a humidifying and heating means mounted on the first mentioned heating means and spaced therefrom having a plurality of air passageways therethrough, a steam chamber surrounding said air passageways connected to the first mentioned heating means and supported thereby, and water pans on said second heating means surrounding the air passageways therethrough, said water pans being of a different level, separated by cascade ribs.

8. A new article of manufacture for use as a heater and humidifier comprising a steel body having a plurality of apertures therethrough, water pans on said body surrounding said apertures, said water pans being arranged at different levels, and means for separating said water pans whereby the water will cascade over said separating means from the upper to the lower levels.

CLARK T. MORSE.